US 7,424,530 B2

(12) United States Patent
Chagoly et al.

(10) Patent No.: US 7,424,530 B2
(45) Date of Patent: Sep. 9, 2008

(54) METHOD FOR VISUALIZING RESULTS OF ROOT CAUSE ANALYSIS ON TRANSACTION PERFORMANCE DATA

(75) Inventors: Bryan Christopher Chagoly, Austin, TX (US); Kirk Malcolm Sexton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 10/840,711

(22) Filed: May 6, 2004

(65) Prior Publication Data
US 2005/0251371 A1 Nov. 10, 2005

(51) Int. Cl.
*G06F 15/173* (2006.01)
(52) U.S. Cl. .................. 709/224; 714/47; 714/48; 705/7
(58) Field of Classification Search .......... 709/223, 709/224; 714/47, 48; 705/7
See application file for complete search history.

(56) References Cited

U.S. PATENT DOCUMENTS

| | | | | |
|---|---|---|---|---|
| 5,369,570 | A * | 11/1994 | Parad | 705/8 |
| 6,330,564 | B1 * | 12/2001 | Hellerstein et al. | 707/101 |
| 6,738,933 | B2 * | 5/2004 | Fraenkel et al. | 714/47 |
| 6,792,460 | B2 * | 9/2004 | Oulu et al. | 709/224 |
| 7,096,459 | B2 * | 8/2006 | Keller et al. | 717/124 |
| 7,134,135 | B2 * | 11/2006 | Cerami et al. | 725/105 |
| 7,197,559 | B2 * | 3/2007 | Goldstein et al. | 709/224 |
| 7,210,071 | B2 * | 4/2007 | Deacon et al. | 714/45 |
| 2002/0073062 | A1 * | 6/2002 | Cerami et al. | 707/1 |
| 2002/0078017 | A1 * | 6/2002 | Cerami et al. | 707/1 |
| 2002/0198984 | A1 * | 12/2002 | Goldstein et al. | 709/224 |
| 2002/0198985 | A1 | 12/2002 | Fraenkel et al. | 709/224 |
| 2003/0065986 | A1 * | 4/2003 | Fraenkel et al. | 714/47 |
| 2004/0049365 | A1 * | 3/2004 | Keller et al. | 702/186 |
| 2004/0068560 | A1 * | 4/2004 | Oulu et al. | 709/224 |
| 2004/0215762 | A1 * | 10/2004 | Oulu et al. | 709/223 |
| 2004/0215768 | A1 * | 10/2004 | Oulu et al. | 709/224 |
| 2005/0096953 | A1 * | 5/2005 | Washington et al. | 705/7 |

FOREIGN PATENT DOCUMENTS

WO    WO 01/86443    11/2001

OTHER PUBLICATIONS

B. Gruschke et al., "Integrated Event Management: Event Correlation Using Dependency Graphs," DSOM 1998.*

(Continued)

*Primary Examiner*—Oanh Duong
(74) *Attorney, Agent, or Firm*—Duke W. Yee; Jeffrey S. LaBaw; Mari Stewart

(57) ABSTRACT

Mechanisms for graph manipulation of transactional performance data are provided in order to identify and emphasize root causes of electronic business system transaction processing performance problems. A system transaction monitoring system, such as IBM Tivoli Monitoring for Transaction Performance™ (ITMTP) system, is utilized to obtain transaction performance data for a system. This transaction performance data is stored in a database and is utilized to present a graph of a given transaction or transactions. Having generated a graph of the transaction, and having identified problem conditions in the processing of the transaction(s), the present invention provides mechanisms for performing graph manipulation operations to best depict the root cause of the problems.

1 Claim, 8 Drawing Sheets

OTHER PUBLICATIONS

Candea et al., "Automatic Failure-Path Inference: A Generic Introspection Technique for Internet Applications", http://www.stanford.edu/~candea/papers/afpi/afpi.html, Dec. 21, 2003, pp. 1-16.

The Open Group, Open Group Technical Standard, "Application Response Measurement Issue 3.0—Java Binding", Published in the U.K. by The Open Group, Oct. 2001, pp. i-103.

* cited by examiner

US 7,424,530 B2

METHOD FOR VISUALIZING RESULTS OF ROOT CAUSE ANALYSIS ON TRANSACTION PERFORMANCE DATA

BACKGROUND OF THE INVENTION

1. Technical Field

The present invention is generally directed to a method and apparatus for visualizing results of root cause analysis on transaction performance data. More specifically, the present invention provides a plurality of graph manipulation mechanisms for providing alternative views of a transactional system architecture in order to emphasize and identify root causes of detected problems.

2. Description of Related Art

IBM Tivoli Monitoring for Transaction Performance™ (hereafter ITMTP) is a centrally managed suite of software components that monitor the availability and performance of Web-based services and operating system applications. ITMTP captures detailed transaction and application performance data for all electronic business transactions. With ITMTP, every step of a customer transaction as it passes through an array of hosts, systems, application, Web and proxy servers, Web application servers, middleware, database management software, and legacy back-office software, may be monitored and performance characteristic data compiled and stored in a data repository for historical analysis and long-term planning. One way in which this data may be compiled in order to test the performance of a system is to simulate customer transactions and collect "what-if" performance data to help assess the health of electronic business components and configurations. ITMTP provides prompt and automated notification of performance problems when they are detected.

With ITMTP, an electronic business owner may effectively measure how users experience the electronic business under different conditions and at different times. Most importantly, the electronic business owner may isolate the source of performance and availability problems as they occur so that these problems can be corrected before they produce expensive outages and lost revenue.

ITMTP permits, for a particular transaction, a user to generate a graph (topology) of the transaction. The graph is a tree that visually describes a transaction through the enterprise software being monitored. While this graph provides an indication of the manner by which a transaction is processed by the various elements of the electronic business, the graph does not provide a mechanism for isolating and detecting the root causes of problems. That is, while ITMTP permits users to be alerted when there are problems, and a graph of the transaction may be provided, there is no mechanism in ITMTP for isolating the root cause of the detected problem within the graph of the transaction. Thus, it would be beneficial to have a mechanism for performing graph manipulations for easily and quickly identifying and emphasizing root causes of problems in transaction processing of an electronic business system.

SUMMARY OF THE INVENTION

The present invention provides a mechanism for graph manipulation of transactional performance data in order to identify and emphasize root causes of electronic business system transaction performance problems. With the present invention, a system transaction monitoring system, such as IBM Tivoli Monitoring for Transaction Performance™ (ITMTP) system, is utilized to obtain transaction performance data for a system, such as an electronic business system. This transaction performance data may be utilized to determine when and where problem conditions occur.

This transaction performance data is stored in a database and is utilized to present a graph, or topology, of a given transaction or transactions. The graph or topology represents the software components that perform some processing of the transaction as it is handled by the system.

Having generated a graph of the transaction, and having identified problem conditions in the processing of the transaction(s), the present invention provides mechanisms for performing graph manipulation operations to best depict the root cause of the problems. The determination of which graph manipulation mechanisms to utilize may be performed automatically based on an analysis of the graph, may be performed manually by a user making use of a graphical user interface, or a combination of automatic and manual selection of the graph manipulation mechanisms.

The graph manipulation mechanism may include, for example, exclusion of certain nodes from the graph structure or inclusion of certain nodes from the graph structure in other nodes of the graph structure, based on a monitoring policy. Another mechanism may include a graph tree reversal mechanism for reversing or inverting a graph tree such that child nodes appear at the top of the graph tree. Child hiding is another useful graph manipulation mechanism of the present invention in which child nodes of graph nodes may be hidden to reduce the size of the depicted graph tree. Another mechanism may be a unique parent view or common child view in which two unique parents who have a common child may be viewed as separate unique branches of a graph tree or may be viewed as a graph tree in which branches intersect.

Yet another graph manipulation mechanism of the present invention includes a host, transaction, application, user (HTAU) manipulation in which a user may expand a leaf node by virtual nodes corresponding to hosts, transactions, applications, or users. Other metrics or parameters associated with the transaction could also be used in addition to, or in replacement of, the host, transaction, application and user parameters to perform graph manipulations without departing from the spirit and scope of the present invention. In addition, other mechanisms for expanding the leaf nodes may include selecting unique values of fields in tables associated with nodes so that only descendants that correspond to the selected field values are depicted.

In addition, the order of child nodes in the graph may be ordered based on the identity of the child nodes. Also, the number of the child nodes may be limited to a finite number in order to reduce the number of depicted child nodes such that the graph is more readable. Other graph manipulation mechanism may be defined with the present invention in addition to, or in replacement of, the above graph manipulation mechanisms without departing from the spirit and scope of the present invention.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a mechanism for graph manipulation of transaction topology graphs so that root causes of problems in the processing of transactions are identified in the graph and emphasized. Since the present invention operates on transaction processing data for a system such as an electronic business system, the present invention is primarily directed to use with systems that are intended to operate in a distributed data processing environment, such as the Internet. Therefore, the following figures, FIGS. 1-3, are provided as example environments in which aspects of the present invention may be implemented.

Figure 1:
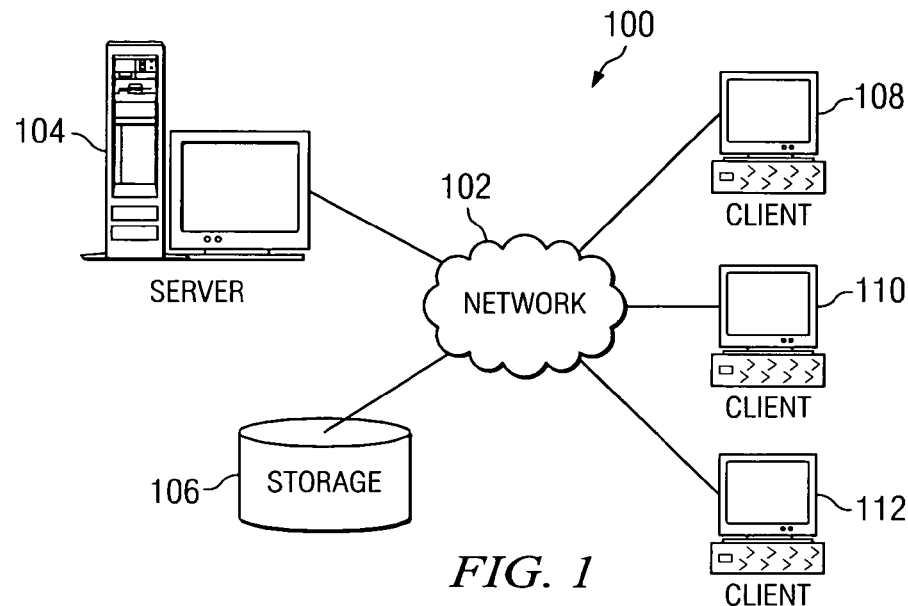
FIG. 1 is an exemplary diagram of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
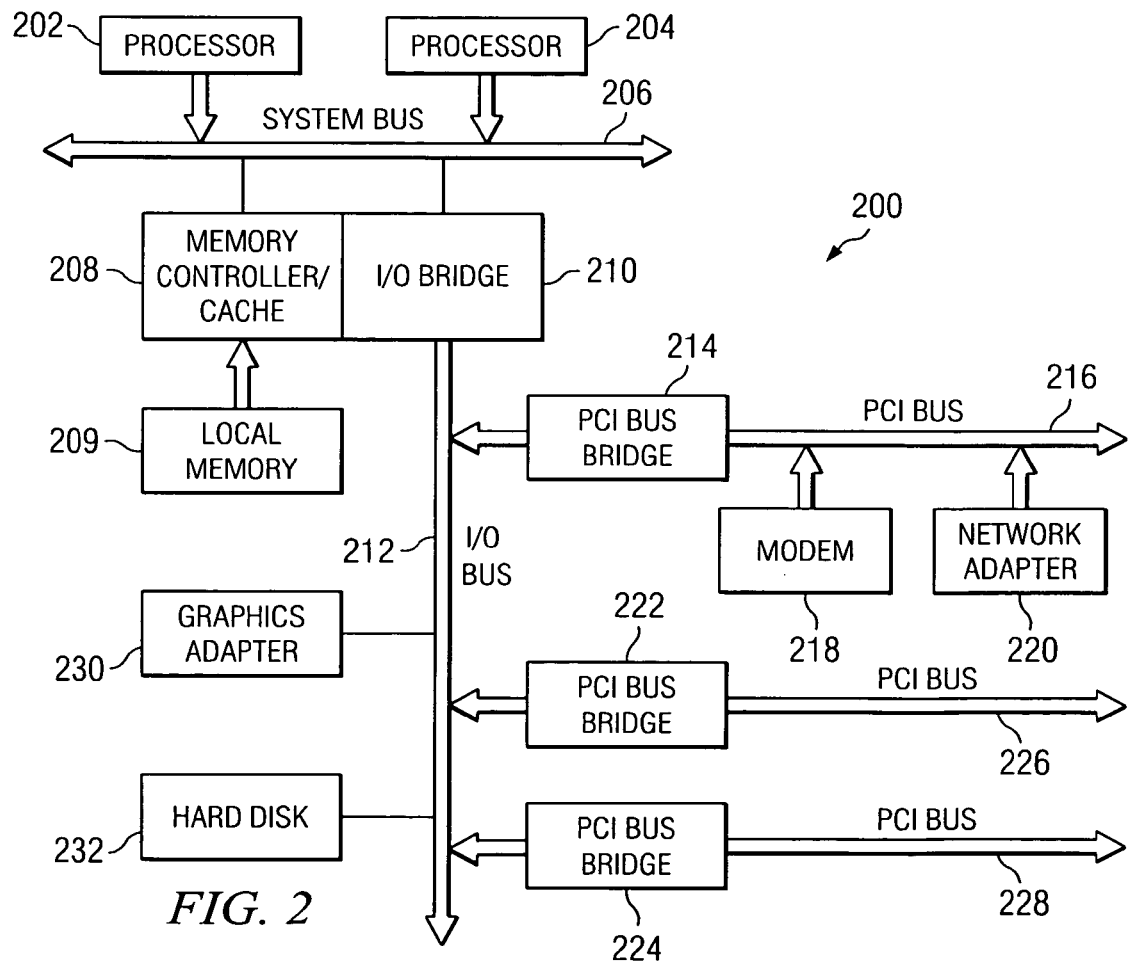
FIG. 2 is an exemplary diagram of a client computing device which may be used to send transactions to elements of the present invention.
Figure 3:
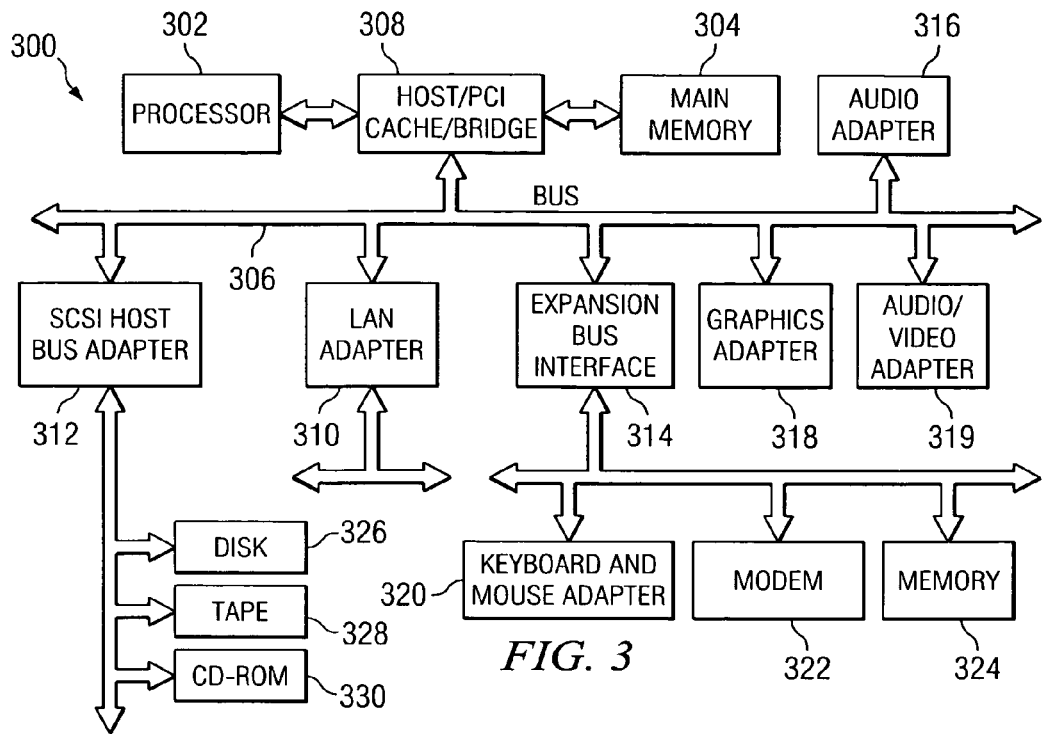
FIG. 3 is an exemplary diagram of a server computing device upon which elements of the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

One or more servers, such as server 104, may provide web services of an electronic business for access by client devices, such as clients 108, 110 and 112. With the present invention, a transaction performance monitoring system is provided for monitoring performance of components of the web server and its enterprise back end systems in order to provide data representative of the enterprise business' performance in handling transactions. In one exemplary embodiment of the present invention, this transaction performance monitoring system is IBM Tivoli Monitoring for Transaction Performance™ (ITMTP) which measures and compiles transaction performance data including transaction processing times for various components within the enterprise system, error messages generated, and the like.

From the compiled transaction performance data, a graph, or topology, of the transaction identifying the components of the enterprise system that performed some processing on the transaction is generated and a corresponding graph data structure is created. The graph may include a plurality of iconic depictions of nodes of the graph corresponding to the type of component the node represents. In addition, performance data may be superimposed or made available through this graph. For example, timing data for each component indicating how long each component took to perform its processing on the transaction may be provided with each iconic depiction of nodes in the graph. In addition, problem identifiers may be provided with iconic depictions of nodes in which problems are detected.

In the known systems, this graph or topology depiction is a fixed topology with a graphical user interface that permits the user to traverse the graph and drill down from a collapsed system overview level to an expanded system overview level, to a drill down view of the transaction, and finally to a method call trace for a particular component of the transaction. The present invention builds upon this known system and provides graph manipulation mechanisms for modifying the depiction of the graph or topology structure of the transaction such that the root cause of a problem in the processing of the transaction may be clearly depicted in an emphasized manner in order to bring a system administrator's attention to the root cause in order to aid in resolving problems in the enterprise system.

Figure 4:
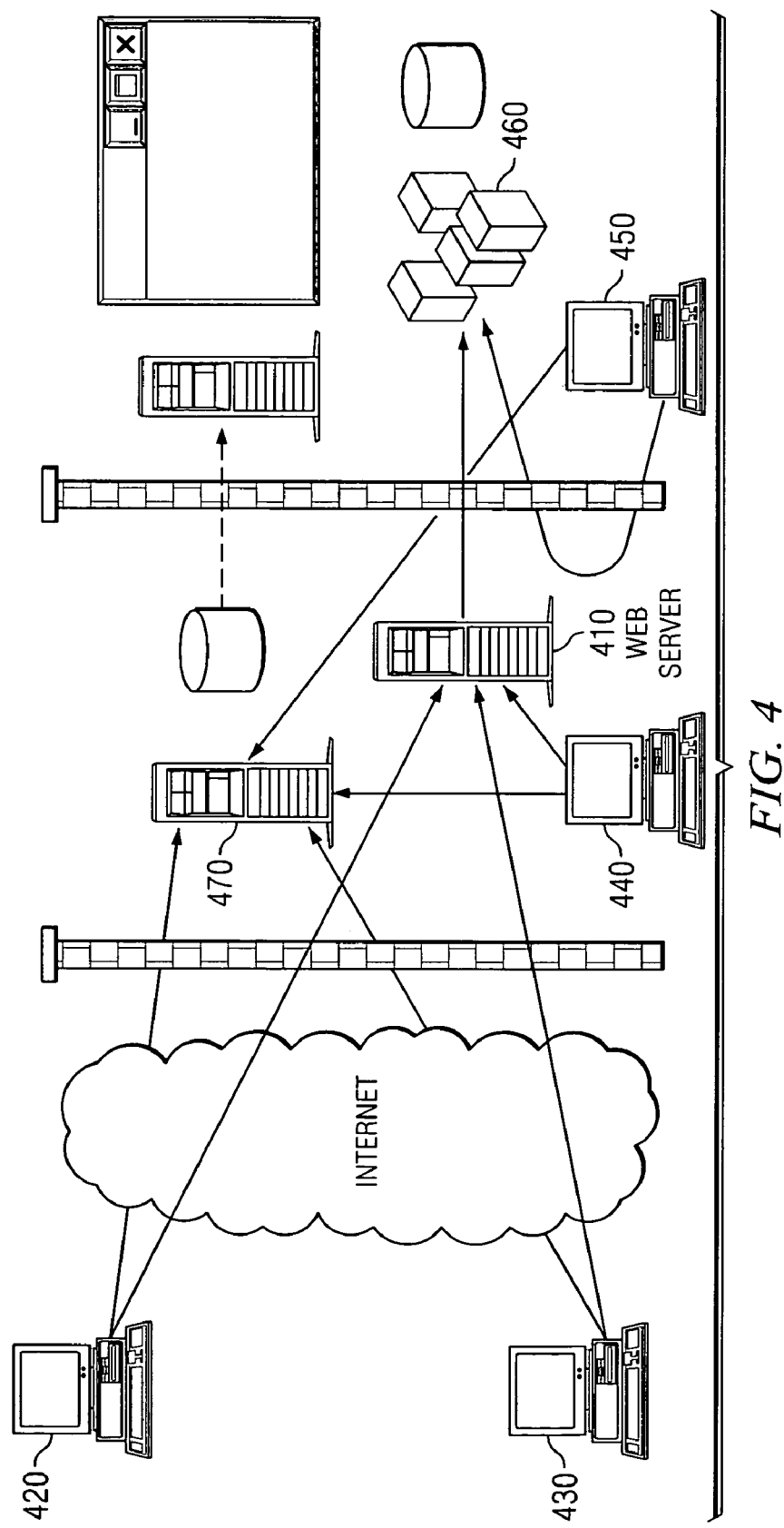
FIG. 4 is a conceptual diagram of an electronic business system in accordance with the present invention.

FIG. 4 is an exemplary diagram of an electronic business system in accordance with a known transaction performance monitoring architecture. As shown in FIG. 4, a web server 410 is provided with which client devices 420-450 may communicate in order to obtain access to services provided by the back-end enterprise computing system resources 460. An ITMTP system 470 is provided for monitoring the processing of transactions by the web server 410 and enterprise computing system resources 460.

The web server 410, enterprise computing system resources 460 and ITMTP system 470 are part of an enterprise system. Client devices 420-450 may submit requests to the enterprise system via the web server 410 which causes transactions to be created. The transactions are processed by the web server 410 and enterprise computing system resources 460 with the ITMTP system 470 monitoring the performance of the web server 410 and enterprise computing system resources 460 as they process the transactions. This performance monitoring involves collecting and storing data regarding performance parameters of the various components of the web server 410 and enterprise computing system resources 460. For example, monitoring of performance may involve collecting and storing information regarding the amount of time a particular component spends processing the transaction, the bit rate of the component, an SQL query, component information including class name and instance id in the JAVA Virtual Machine (JVM), memory usage statistics, any properties of the state of the JVM, properties of the components of the JVM, and/or properties of the system in general.

The components of the web server 410 and enterprise computing system resources 460 may include both hardware and software components. For example, the components may include host systems, JAVA Server Pages, servlets, entity beans, Enterprise Java Beans, data connections, and the like. Each component may have its own set of performance characteristics which may be collected and stored by the ITMTP system 470 in order to obtain an indication as to how the enterprise system is handling transactions. More information regarding the manner by which the ITMTP system 470 collects performance data, stores it, and uses it to generate reports and transaction graph data structures may be obtained from the Application Response Measurement (ARM) Specification, version 3.0, which is available from the Open Group at www.opengroup.org/tech/management/arm/uploads/40/2459/ARM3Final.pdf, which is hereby incorporated by reference.

As mentioned above, the transaction data that is collected and stored by the ITMTP system 470 is used to generate a graph data structure for depicting the interaction of the components involved in processing transactions. The graphical representation of the graph data structure, in a preferred embodiment, resembles a tree graph data structure in which nodes may be parent and/or child nodes in the tree graph data structure. Parent nodes have pointers to their child nodes and child nodes have pointers to their parent nodes. A child node may be a parent to its own child nodes. In addition, each node has its own set of component attributes and may include method trace information for identifying the methods executed by the component represented by the node.

Figure 5:
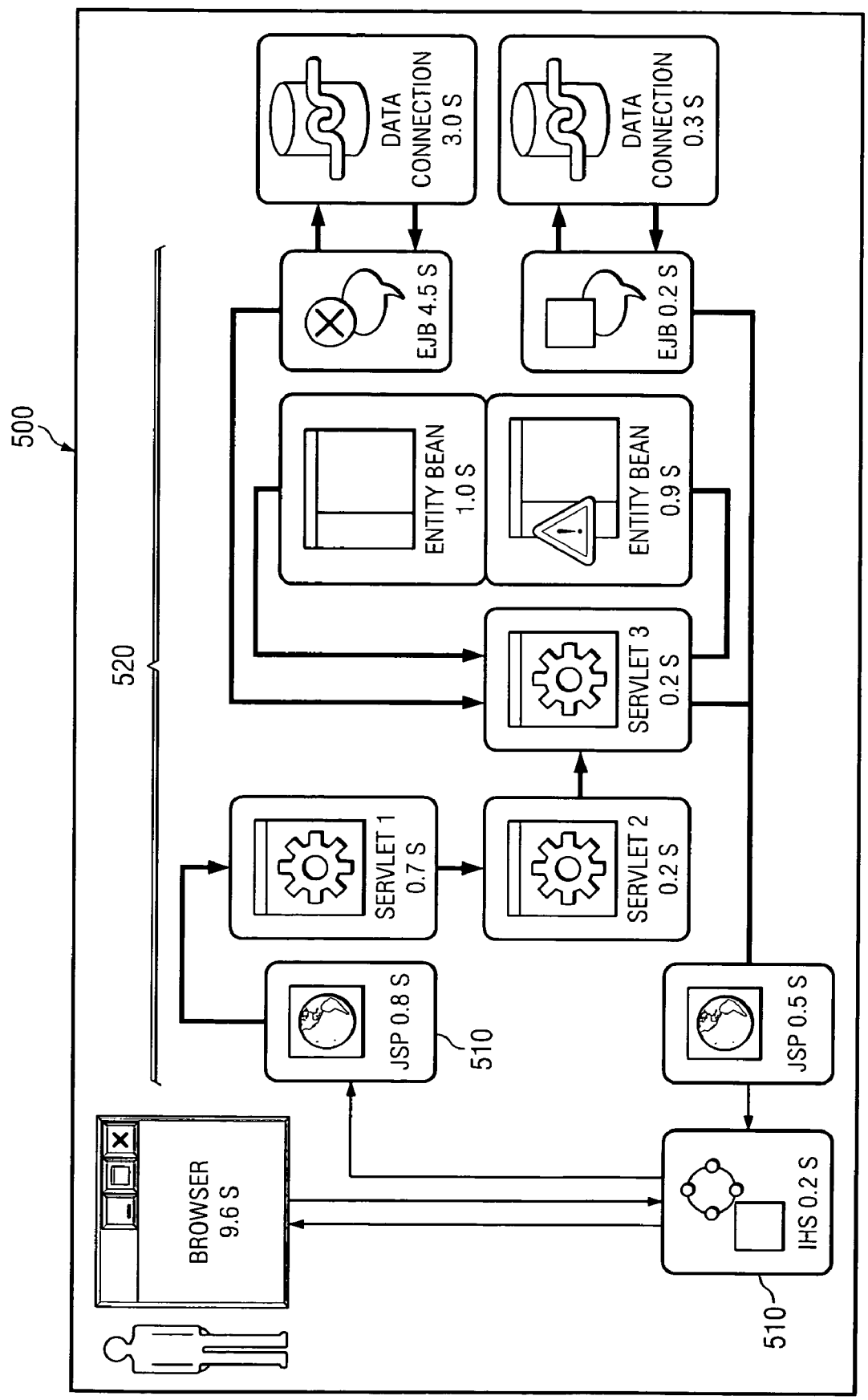
FIG. 5 is an exemplary diagram illustrating the primary operational elements of the present invention.

FIG. 5 is an exemplary diagram illustrating a graphical user interface representation of a transaction graph data structure. As shown in FIG. 5 the graph data structure representation 500 includes a plurality of nodes 510 representing various components of an enterprise system 520 through which a transaction is processed. The nodes 510 represent various components including the browser of the client device and the internet host system (which are indicated as external to the enterprise system 520), JAVA Server Pages, servlets, entity beans, Enterprise JAVA Beans, and data connections (which are also indicated as being external to the enterprise system 520). Arrows between nodes 510 represent data flow from component to component as the transaction is processed.

Various indicators may be provided associated with each iconic representation of the enterprise system components. These indicators may be used to identify the components where additional attention of the system administrator(s) is warranted. For example, these indicators may identify components where collected performance data indicates an error, less than acceptable performance, potential bottlenecks, and the like.

Nodes 510 in the graph data structure representation 500 are selectable in order to obtain more detailed information about the nodes 510. For example, a node may be selected in order to view the node's component attributes, a method trace associated with the node, and the like.

Figure 6:
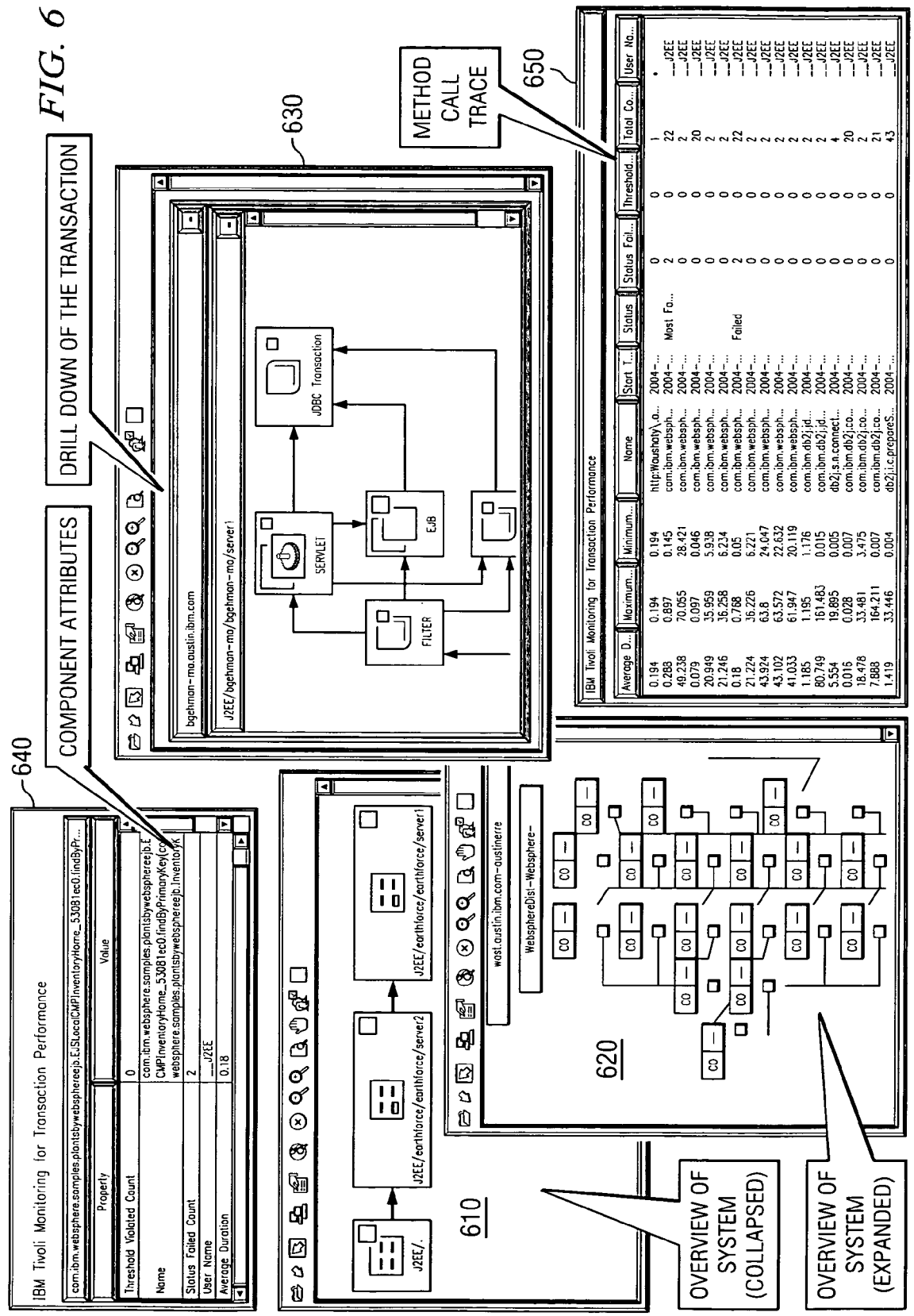
FIG. 6 is an exemplary diagram of a graphical display of a transaction in accordance with the IBM Tivoli Monitoring for Transaction Performance™ tool.

FIG. 6 is an exemplary diagram illustrating a progression decomposing a graph data structure representation for a transaction from a system overview level to a method trace level. As shown in FIG. 6, a graph or topology of a transaction may be provided, initially, in a collapsed system overview representation 610. The collapsed system overview representation 610 includes only a minimal number of nodes for representing the enterprise system. This representation may be expanded to obtain an expanded system overview representation 620 in which the nodes in the collapsed system overview representation 610 are expanded so that their internal components at a next level of abstraction are made visible.

The expanded system overview representation 620 may then be drilled down to a transaction representation 630 in which the components involved in the transaction are represented in the depicted graph data structure. From there, individual nodes of the transaction representation 630 may be selected to obtain a component attribute representation 640 and/or a method call trace 650.

As discussed previously, the graph data structure representations described above, and illustrated in FIGS. 5 and 6 are fixed topology structures. In other words, while a user may traverse the topology and drill down into the topology, there are no mechanisms for modifying the topology so that certain aspects of the topology are emphasized over other aspects of the topology. Of particular note is that there is no mechanism available in the known systems to modify the graph or topology representation such that root causes of problems in the enterprise system are brought to the forefront of the representation and are emphasized over other aspects of the topology. While for smaller, less complicated enterprise systems, traversing this fixed topology may not cause much of an inconvenience to the human user, for more complex systems, it may be quite daunting a task to identify the root cause of an error or problem with the transaction processing.

The present invention builds upon the graph mechanism described above by providing graph manipulation mechanisms for modifying the presentation of the transaction representation 630 such that the root cause of problems being experienced with the enterprise system are emphasized and are easily identifiable by users of the present invention, e.g., system administrators. The graph manipulation mechanisms of the present invention operate to modify an actual topology of the transaction, i.e. the topology through which the transaction is processed, into a modified topology that is a change in the organization of component nodes which makes it easier for a human user to view the root cause of errors or problems in the processing of the transaction. These graph manipulation mechanisms may be performed automatically by the graphical user interface of a transaction processing performance monitor, may be selected by a human user of the graphical user interface, and/or a combination of automatic and user initiated graphical manipulation mechanisms may be utilized.

The actual topology or original transaction processing topology is represented as a first graph that is comprised of first nodes that represent system entities involved in processing of a sub-transaction of the transaction, e.g., the systems and the network interconnections. The first nodes may be child nodes, parent nodes, or both.

The present invention takes the actual topology represented by the first graph and generates a virtual topology, represented by a second graph, based on the actual topology. The second graph is a graph of nodes which may or may not correlate to nodes in the first graph. The second graph represents a higher level of abstraction, i.e. where the nodes are selective or a combination of nodes when compared to the first graph of nodes. A second graph node may also be a child node, a parent node, or both.

Figure 7:
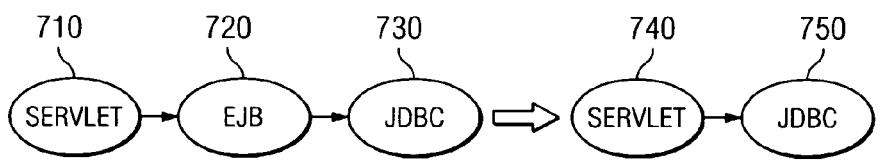
FIG. 7 is an exemplary diagram illustrating a graph manipulation mechanism in which a monitoring policy eliminates nodes of a certain type from the graphical representation in accordance with one exemplary embodiment of the present invention.

FIG. 7 is an exemplary diagram illustrating a graph manipulation mechanism in which a monitoring policy eliminates nodes of a certain type from the graphical representation of the first graph to generate a second graph, in accordance with one exemplary embodiment of the present invention. With this graph manipulation mechanism, a monitoring policy may be established that indicates the types of components that a system administrator, or other user, is not interested in seeing in the graphical representation of the transaction topology. In other words, the monitoring policy may identify certain types of components for which performance monitoring is to be disabled. As a result, when the graphical representation of the transaction topology is rendered, the rendering engine compares the monitoring policy with attributes of the nodes that are part of the first graph or topology. If a node has an attribute identifying it as corresponding to a component that matches the component type or types in the monitoring policy, then the node will be eliminated from the second graph of the transaction processing topology.

The elimination of a node in the first graph when generating the second graph of the transaction processing topology involves identifying any parent of the node to be eliminated in the first graph, and children nodes of the node to be eliminated in the first graph, and then generating nodes in the second graph to graphically representing the children from the first graph as children of a parent node in the second graph corresponding to the parent node of the node that is to be eliminated in the first graph. This is illustrated in FIG. 7 in which the transaction processing topology or first graph includes a servlet node 710, an Enterprise Java Bean (EJB) node 720, and a Java Database Connectivity (JDBC) node 730.

Assume that the monitoring policy established by the user states that the user is not interested in viewing nodes associated with EJBs. This may be the fact for many different reasons. For example, the user may be aware that there are a proportionally greater number of EJBs in the enterprise system than any other component and the user wishes to minimize the size of the graph so that possible error sources are more easily identifiable. Similarly, if the user has determined that, based on historical information, root causes of errors typically do not arise in components of a certain type, these components may be eliminated from the transaction processing topology in order to simplify the topology for quicker identification of root causes of errors or problems with transaction processing.

The essence of this graph manipulation is to use process of elimination to find root cause. The user session during graph manipulation represents this process of elimination. Each successive graph represents a different model of the transaction. Each node represents a probable root cause. By decreasing the number of nodes, the user is eliminating possible root causes. By increasing the number of nodes, the user is determining a more precise set of possibilities for a root cause.

When the monitoring policy is applied to the transaction processing topology or first graph, the resulting second graph representation includes only the servlet node 740, as a parent node, and the JDBC node 750, as a child node of the parent node 740. With regard to the data structure representing the first graph, the entries in the first graph data structure are copied over to a second graph data structure and then the second graph data structure is used to generate the second graph representation. During the copying over process, if an entry has an attribute identifying the component or node corresponding to the entry as being a component or node for which the monitoring policy indicates monitoring to be disabled, the entry is not copied over to the second graph data structure. Any parent entry and child entries of this entry are modified to point to each other. As a result, the parent entry of the removed entry is now the parent of the child entries of the removed entry, and the graphical representation is as shown in FIG. 7, elements 740 and 750. This greatly simplifies the graphical depiction of the transaction processing topology of the enterprise system when the topology is complex.

The idea here is that two nodes may be different because of only the application associated to the node. By removing the application distinction, the two nodes become the same, and so the view of the graph shows one node instead of two. This reduces the graph size, simplifying the view. In essence, the user is saying that the root cause is not the application, and to unbind it from the nodes.

It should be noted that the graphical user interface through which the graphical depictions of the transaction processing topologies are presented may include user selectable virtual buttons, menus, etc., via which the application of the monitoring policy may be removed from the modified graphical representation of the topology. In this way, the first graph representation of the transaction processing topology may be obtained from the second transaction processing topology.

Figure 8:
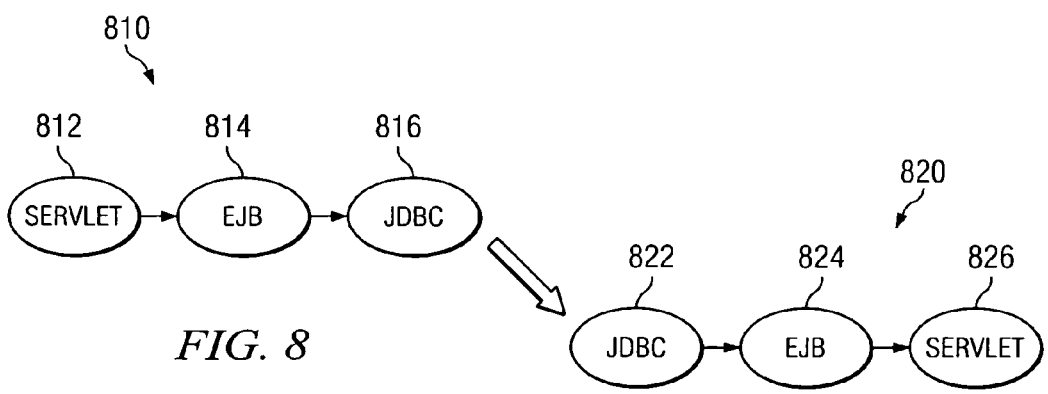
FIG. 8 is an exemplary diagram of a tree reversal graph manipulation mechanism in accordance with one exemplary embodiment of the present invention.

FIG. 8 is an exemplary diagram of a tree reversal graph manipulation mechanism in accordance with one exemplary embodiment of the present invention. With this graph manipulation mechanism, a first graph may be inverted such that child nodes in the first graph are represented as parent nodes in the second graph. This type of graph manipulation mechanism is useful when it is determined that problems or errors in the transaction processing typically occur with leaf nodes of the transaction processing topology. As a result of this reversal, the second graph of the transaction processing topology has the most likely root cause of the error or problems at the top of the second graph.

In order to perform this reversal of the first graph to generate a reversed second graph, a column of the first graph data structure representing the child nodes and the column of the first graph data structure representing the parent nodes are switched and stored in a second graph data structure. As a result, the child nodes in the first graph are now parent nodes in the second graph and the parent nodes in the first graph are now child nodes in the second graph. The graphical representation of the second graph is then generated using this second graph data structure.

An example of the graph reversal mechanism of the present invention is shown in FIG. 8. As shown in FIG. 8, an first graph 810 includes a parent node 812 that represents a servlet, a child node 814 of the parent node 812 which represents an Enterprise Java Bean, and a child node 816 of the child node 814. When the first graph 810 is reversed using the mechanisms of the present invention, the result is the second graph 820. The second graph 820 includes a parent node 822 that corresponds to child node 816, a child node 824 corresponding to child node 814, and another child node 826 that corresponds to the parent node 812.

Since, in many cases, the leaf nodes, or nodes nearest the leaf nodes, of the transaction processing topology tend to be the root cause of processing problems or errors, by performing the reversal modification of the present invention, the root cause node is brought to a more prominent position in the second graph representation. While the depicted examples are kept simple for clarification purposes, it can be appreciated that with complex topologies, such a reversal mechanism will greatly speed up the locating of the root cause of problems being experienced with transaction processing.

Figure 9:
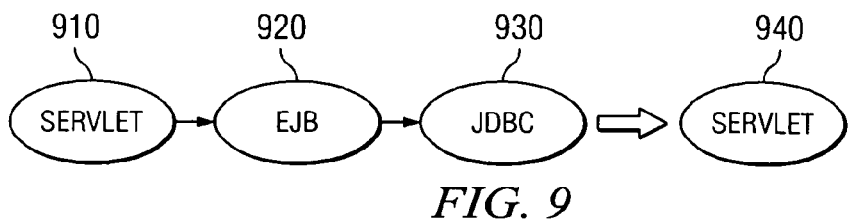
FIG. 9 is an exemplary diagram of a child node hiding graph manipulation mechanism in accordance with one exemplary embodiment of the present invention.

FIG. 9 is an exemplary diagram of a child node hiding graph manipulation mechanism in accordance with one exemplary embodiment of the present invention. With this manipulation mechanism, child nodes of a parent node in the first graph may be removed from the second graph representation of the transaction processing topology. This permits subtrees of the first graph to be removed from the graphical representation of the transaction processing topology.

From the standpoint of the first graph data structure, child nodes of a designated parent node are not copied over to the second graph data structure when generating the graphical representation of the transaction processing topology. As a result, these child nodes are not included in the graphical representation that the user perceives.

An example of this child hiding mechanism is provided in FIG. 9. As shown in FIG. 9, the first graph data structure includes a parent node 910, a child node 920 of the parent node 910, and another child node 930 of the child node 920. In the second graph, the child nodes 930 and 920 are eliminated from the second graph and only a node 940 corresponding to the parent node 910 is present in the second graph. One way in which this child hiding may be performed is by eliminating the child node column of the first graph data structure in the second graph data structure when the second graph data structure is generated.

Figure 10:
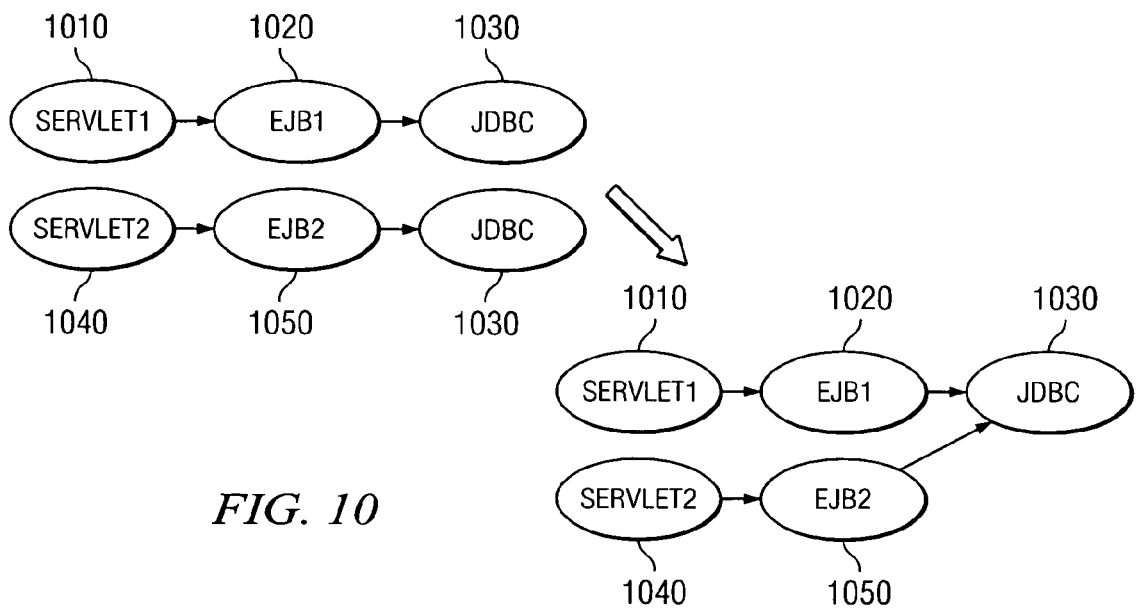
FIG. 10 is an exemplary diagram of a unique parent view or common child view graph manipulation mechanism in accordance with one exemplary embodiment of the present invention.

FIG. 10 is an exemplary diagram of a unique parent view or common child view graph manipulation mechanism in accordance with one exemplary embodiment of the present invention. This mechanism is used when there are two parent nodes that have a common child node. This mechanism permits the user to switch between a view of the transaction processing topology in which common child nodes are repeated in separate tree structures corresponding to their parent nodes, and a view of the transaction processing topology in which a single node is depicted for the child node with all parent nodes of the common child node pointing to the single node. The separate tree representation is a default representation in the first graph of the transaction processing topology. The single node representation may be selected in order to reduce the number of redundant nodes present in the graphical depiction of the transaction processing topology.

FIG. 10 illustrates an example of the unique parent/common child representations according to the present invention. As shown in FIG. 10, in a unique parent representation, the second graph structure includes a parent node 1010, a child node 1020 of the parent node 1010, and a child node 1030 of the child node 1020. In addition, a separate tree is provided having a parent node 1040, a child node 1050 of the parent node 1040, and a copy of the child node 1030.

When switched to a common child representation, rather than having a copy of the common child node 1030 in each tree, the trees merge at the common child node 1030. That is, the child node 1020 and the child node 1040 both point to the same single node representation of the common child node 1030. In this way, redundant nodes in the graphical representation of the transaction processing topology are removed and thus, the graphical representation is simplified making it less difficult to identify root causes of errors or problems in transaction processing.

Figure 11:
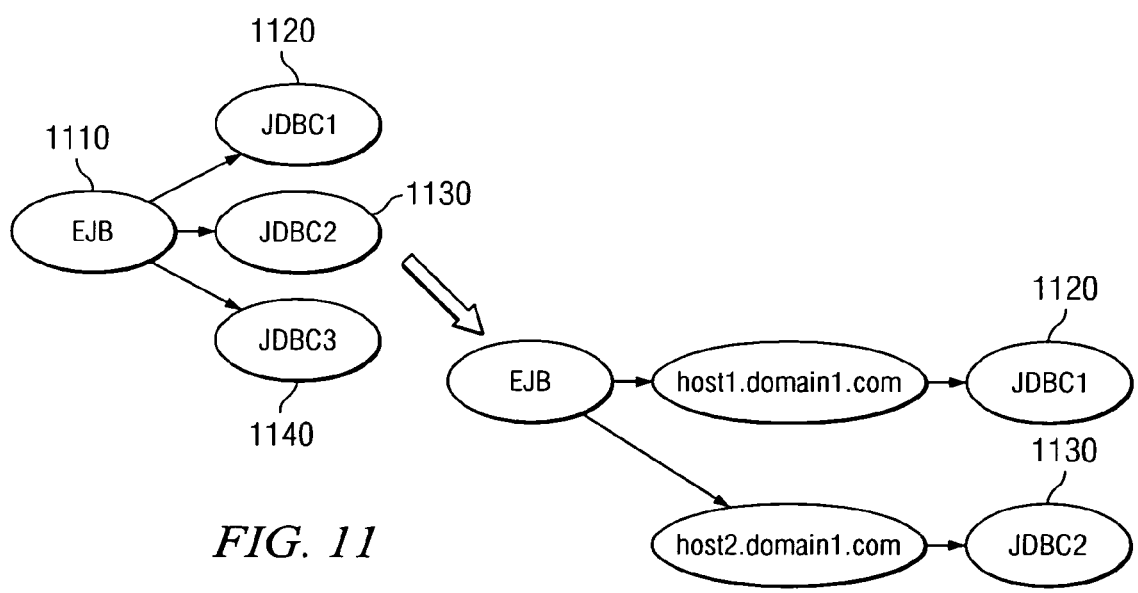
FIG. 11 is an exemplary diagram of a HTAU graph manipulation mechanism in accordance with one exemplary embodiment of the present invention.

FIG. 11 is an exemplary diagram of a Host, Transaction, Application, User (HTAU) graph manipulation mechanism in accordance with one exemplary embodiment of the present invention. This graph manipulation mechanism permits the limitation of an first graph node's child nodes based on one or more of the host, transaction, application, user, or other attributes of the actual node. That is, child nodes of a first graph node will only be included in the second graphical representation of the transaction processing topology if they include the same selected attributes. For example, if a selected attribute is a particular application of the parent node, only child nodes that have the same application attribute as the parent node will be included in the second graphical representation of the transaction processing topology.

In limiting the child nodes included in the second graphical representation, node entries from the first graph data structure are copied to a second graph data structure. If a parent node has a selected attribute, e.g., host, transaction, application, or user attribute, then each child node entry in the first graph data structure is checked to determine if they include the same selected attribute or attributes. If the child node has the same selected attribute or attributes, it is copied over to the second graph data structure. If it does not have the same selected attribute or attributes, then the child nodes is not copied over to the second graph data structure. If this child node is the parent node of another child node, then a mechanism such as that described above with regard to FIG. 7 may be used to represent the child nodes. In this way, child nodes may be removed from the second graphical representation if they are not of interest to the user.

FIG. 11 illustrates an example of the HTAU graph manipulation mechanism of the present invention. As shown in FIG. 11, a first graph of the transaction processing topology includes an EJB 1110 and a plurality of child nodes JDBC1 1120, JDBC2 1130, and JDBC3 1140. The EJB 1110 may be expanded by selection of one or more attributes of the EJB with which children are to be associated and displayed. Child nodes that do not correspond to the selected attributes are not displayed.

Thus, in the depicted example, since JDBC1 1120 and JDBC2 1130 have attributes matching the selected attributes of the EJB 1110, i.e. host names that are host1.domain1.com or host2.domain1.com, these child nodes are displayed. Since JDBC3 1140 does not have a host name corresponding to either of host1.domain1.com or host2.domain2.com, the JDBC3 node 1140 is not displayed in the modified graph of the transaction processing topology.

Figure 12:
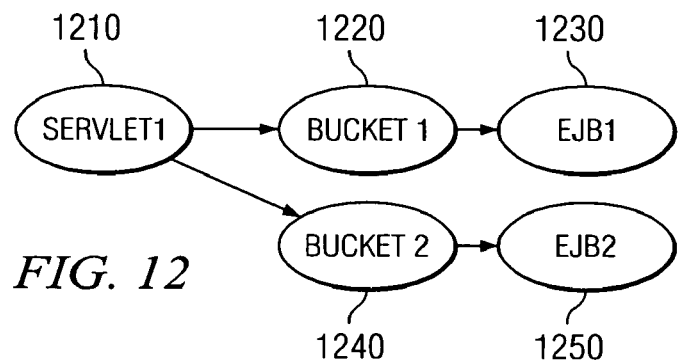
FIG. 12 is an exemplary diagram of a parametric search graph manipulation mechanism in accordance with one exemplary embodiment of the present invention.

FIG. 12 is an exemplary diagram of a parametric search graph manipulation mechanism in accordance with one exemplary embodiment of the present invention. This graph manipulation mechanism is similar to that described above with regard to FIG. 11 except that a node may be expanded by selecting unique values of fields in tables associated with an actual node.

Each node is bound to a set of attributes. During parametric search, each attribute may have more than one value. Nodes are not considered unique based on the value of the attribute, but by their key, until the user binds a value to the key. This binding prunes the graph at the corresponding node to eliminate sub-graphs that could not be derived without this binding. For example, node A may have a child node B with attributes named 'health' and 'host'. The corresponding values for the attribute 'health' may be 'good' and 'bad'. The corresponding values for the attribute 'host' may be 'host1.domain.com' and 'host2.domain.com'. The actual transaction may have a binding of the health to the host, such that host1.domain.com has bad health and the host2.domain.com has good health. The user does not see this binding until he/she narrows the parametric search by binding either the health attribute or the host attribute. By binding a value on an attribute, e.g. health to the value bad, then attribute host is implicitly bound to host1.domain.com.

Consider a modification of the example where there was a third host, host3.domain.com, for which the actual transaction data bound the health to bad. By binding the health to bad in the parametric search, the host1.domain.com would be eliminated from the attribute values to which host could be bound.

Figure 13:
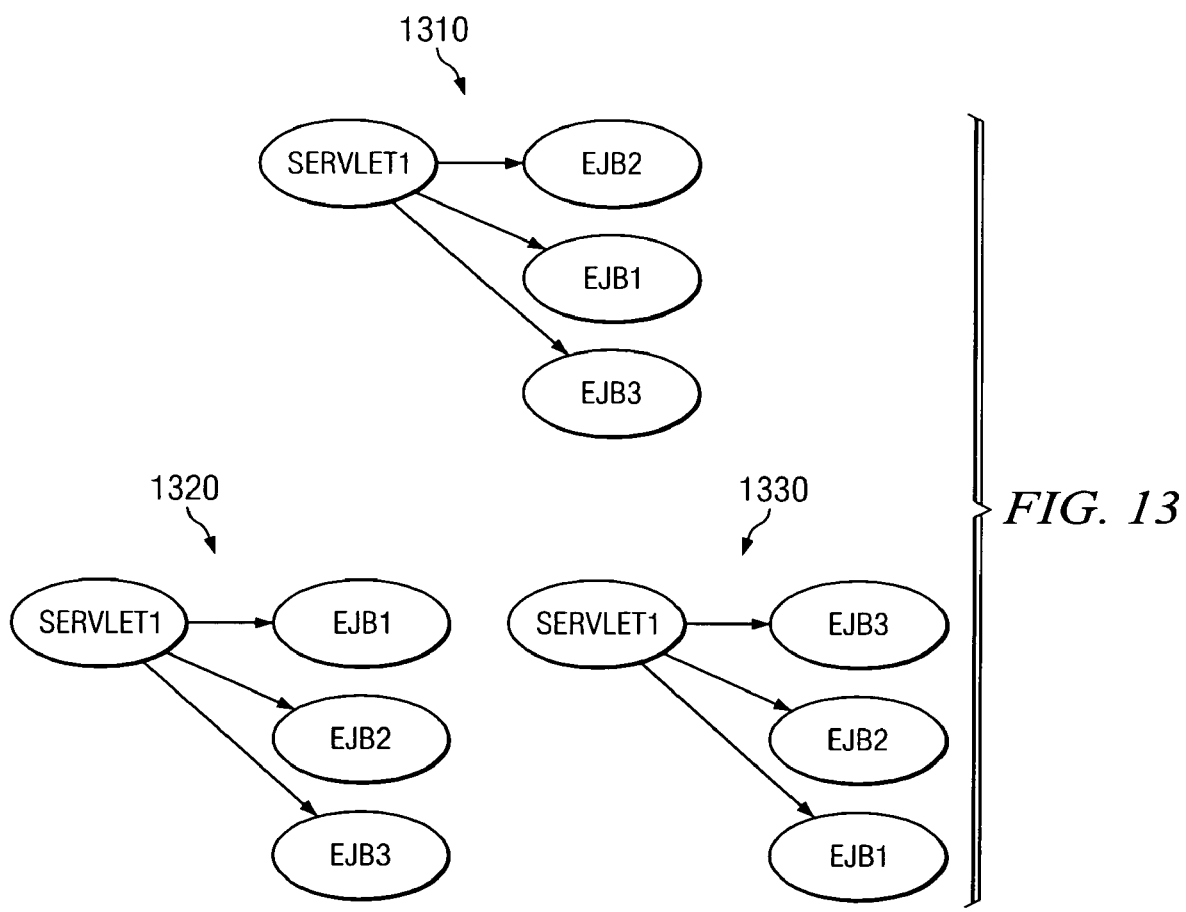
FIG. 13 is an exemplary diagram of a child node ordering graph manipulation mechanism in accordance with one exemplary embodiment of the present invention.

FIG. 13 is an exemplary diagram of a child node ordering graph manipulation mechanism in accordance with one exemplary embodiment of the present invention. With this graph manipulation mechanism, the order in which child nodes are presented in the graphical representation may be selected based on attributes of the child nodes. These attributes may be the name of the child node, host name, transaction, application, user, response time, and the like. Any ordering criteria may be used without departing from the spirit and scope of the present invention. For example, in order to more quickly identify possible root causes of errors or problems, the child nodes may be ordered such that the worst performing child nodes are at the top of the group of child nodes.

With this graph manipulation mechanism, the ordering criteria may be set a priori or may be input by a user at the time the graphical representation is to be generated. This ordering criteria is then used along with an ordering algorithm to traverse the first graph data structure and copy entries from the first graph data structure to a second graph data structure in a proper order according to the ordering criteria. The resulting second graph data structure is then used to render the graphical representation of the modified transaction processing topology.

FIG. 13 illustrates two orderings of child nodes that may be obtained using the ordering mechanism of the present invention. As shown in FIG. 13, when the first graph 1310 is generated according to transaction processing monitor data obtained from monitoring transaction processing by the ITMTP system, the child nodes may be in a random order based on how the child nodes are encountered during transaction monitoring. With one embodiment of the present invention, i.e. graph 1320, the child nodes may be ordered in ascending order. In another embodiment of the present invention, i.e. graph 1330, the child nodes may be ordered in descending order.

This mechanism permits any ordering of the child nodes that is deemed to be most helpful in identifying the root cause of errors or problems with transaction processing. Using the ordering mechanism, child nodes that have attributes indicative of being sources of problems with regard to transaction processing may be placed at the top of a group of child nodes so that they are more easily noticed by a user. For example, the child nodes may be ordered according to worst response times such that the most probable root cause of an error or problem is placed at the top of the group of child nodes.

In addition, the number of child nodes that are actually displayed may be limited to a designated number. Thus, once ordering of the child nodes is performed in accordance with the embodiments described above, only the designated number of child nodes from the top of the reordered group will actually be displayed. For example, if the limit is set to 10, only the top 10 child nodes in the reordered group of child nodes will be displayed. Child nodes appearing in the group after the 10 child node will not be present in the modified graphical representation of the transaction processing topology.

While various mechanisms for graph manipulation have been described above, these are not exhaustive of the possible graph manipulation mechanisms that may be implemented using the present invention. To the contrary, the present invention is intended to include any graph manipulation mechanism that may be applied to actual graphs of transaction processing performance monitoring data in order to identify and emphasize root causes of errors or problems in transaction processing of an enterprise system. For example, another graph manipulation may be one in which nodes representing root causes of errors may be directly linked to the root of the graph with all other child nodes removed. Other graph manipulation mechanisms, which may become apparent to those of ordinary skill in the art in view of the present disclosure, are intended to be within the spirit and scope of the present invention.

It should also be noted that while the above graph manipulation mechanisms are described separately for clarity, these graph manipulation mechanisms may be used in conjunction with one another. Thus, both the HTAU graph manipulation mechanism and the child ordering graph manipulation may be used together, for example. In such embodiments, a first graph manipulation mechanism may be applied to the actual graph data structure in order to generate a first virtual graph data structure. A second graph manipulation mechanism may then be applied to the first virtual graph data structure in order to generate a second virtual graph data structure. This process may be repeated for each subsequent graph manipulation mechanism.

Also, as noted above, these graph manipulation mechanisms may be performed automatically, manually, or both. With an automated mechanism, based on the identified problem location(s) in a transaction processing topology, as determined by the ITMTP system, an appropriate graph manipulation mechanism may be selected that would best emphasize the problem location(s). Thus, for example, if the problem location is in a child node that is one of one hundred child nodes of a parent node, then the child ordering mechanism may be used along with a limit on how many child nodes are displayed. As a result, the child node in which the problem is detected may be more easily identified.

Figure 14:
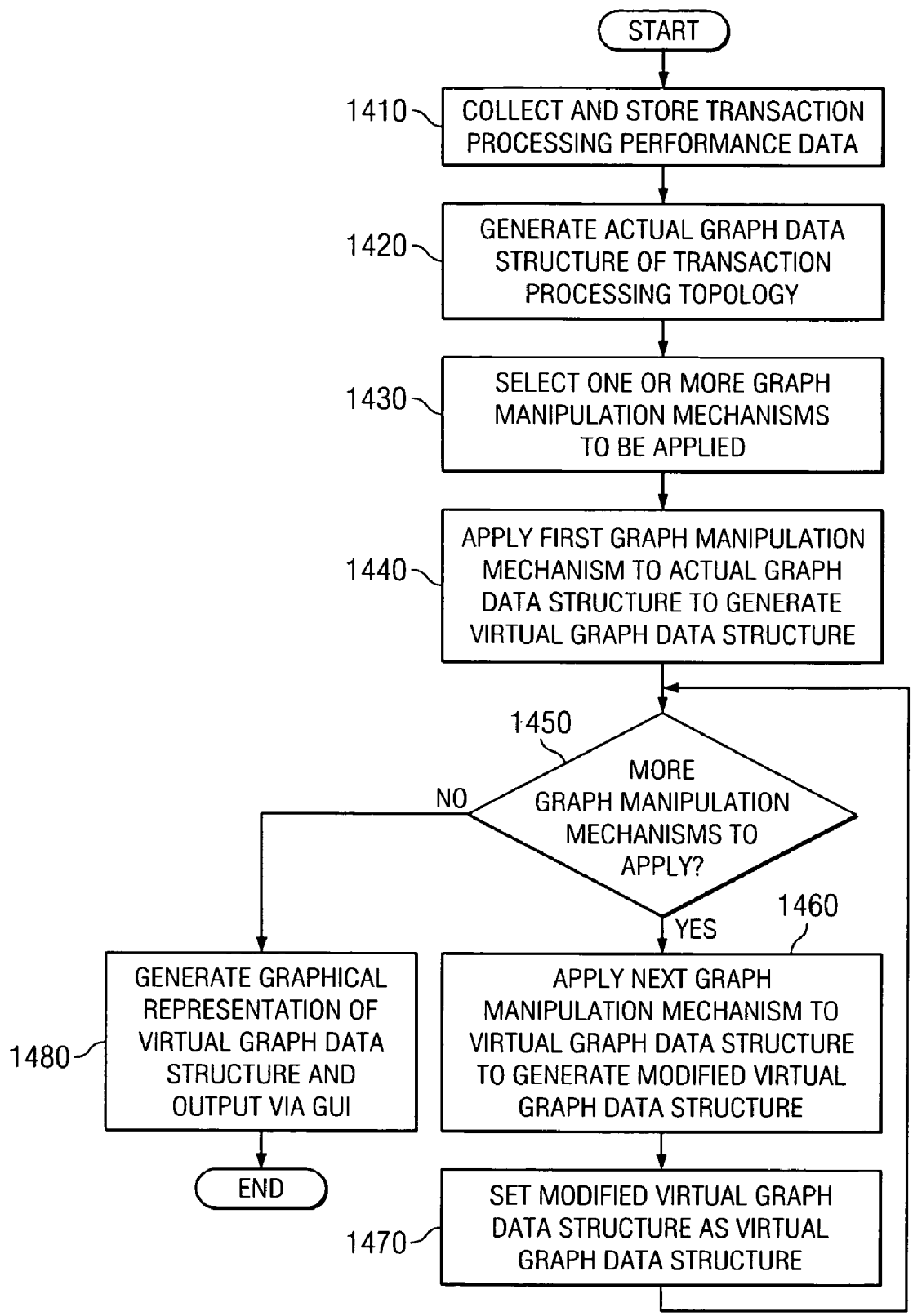
FIG. 14 is a flowchart outlining an exemplary operation of the present invention when performing graph manipulations to identify and emphasize root causes of transactional processing problems in accordance with one exemplary embodiment of the present invention.

FIG. 14 is a flowchart that illustrate outlines an overall graph manipulation mechanism in accordance with the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As stated above, FIG. 14 is a flowchart outlining an exemplary operation of the present invention when performing graph manipulations to identify and emphasize root causes of transactional processing problems in accordance with one exemplary embodiment of the present invention. As shown in FIG. 14, the operation starts by collecting and storing transaction processing performance data in a database (step 1410).

The transaction processing performance data is then utilized to generate a first graph data structure of a transaction processing topology (step 1420). One or more graph manipulation mechanisms are selected to be applied to the first graph data structure (step 1430). This may be done either automatically, manually, or both.

A first graph manipulation mechanism is applied to the first graph data structure in order to generate a second graph data structure (step 1440). A determination is then made as to whether there are additional graph manipulation mechanisms to be applied (step 1450). If so, a next graph manipulation mechanism is applied to the second graph data structure to generate a modified second graph data structure (step 1460). The modified second graph data structure is then set as the second graph data structure (step 1470) and the operation returns to step 1450.

If there are no additional graph manipulation mechanisms to be applied, the second graph data structure is used to generate a graphical representation of the transaction processing topology (step 1480). This graphical representation is modified from the graphical representation that would be obtained from the first graph data structure due to the application of the one or more graph manipulation mechanisms.

Thus, the present invention provides a plurality of graph manipulation mechanisms through which a first graph of a transaction processing topology, obtained from transaction processing performance monitoring data, may be modified. These modifications are used to provide a graph of the transaction processing topology through which a user may more easily identify the root cause of transaction processing problems in an enterprise system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for identifying problem components of an enterprise computing system, comprising:
   obtaining transaction processing performance data for the enterprise computing system;
   generating a first graph data structure of a transaction processing topology of the enterprise computing system based on the transaction processing performance data;
   receiving input from a user designating a particular type of graph manipulation mechanism to perform on the first graph data structure to form a designated type of graph manipulation mechanism;
   identifying a graph manipulation mechanism based on the designated type of graph manipulation mechanism to be applied to the first graph data structure based on characteristics of the first graph data structure, wherein the characteristics include identified problem locations in the first graph data structure;
   applying one or more graph manipulation mechanisms based on the designated type of graph manipulation mechanism to the first graph data structure to generate a second graph data structure of the transaction processing topology, wherein applying the one or more graph manipulation mechanism further comprises:
      modifying the first graph data structure such that root causes of problems in the enterprise computing system are emphasized and brought to a forefront of a graphical representation of the transaction processing topology of the enterprise computing system; and
      applying a monitoring policy to the first graph data structure, wherein the monitoring policy identifies types of components of the enterprise computing system that are to be removed from the first graph data structure, and wherein applying the monitoring policy to the first graph data structure includes generating a second graph data structure in which nodes corresponding to the identified types of components in the monitoring policy are not present; and
   generating a graphical representation of the transaction processing topology based on the second graph data structure, wherein the second graph data structure is a modified form of the first graph data structure, wherein the one or more graph manipulation mechanisms include a tree reversal mechanism, a child node hiding mechanism, a unique parent/common child node view switching mechanism, a parametric value child node limitation mechanism, a parametric search mechanism, and a child node ordering mechanism, wherein the tree reversal mechanism contains child nodes of the first graph data structure represented as parent nodes in the second graph data structure and parent nodes of the first graph data structure represented as child nodes in the second graph data structure, wherein the child node hiding mechanism contains child nodes in the first graph data structure that are not present in the second graph data structure, wherein the unique parent/common child node view switching mechanism contains a view of two or more branches of the first graph data structure which point to a common child node depicted in the second graph data structure as separate branches or branches pointing to a common child node depending on the state of the switching mechanism, wherein the parametric value child node limitation mechanism contains child nodes in the first graph data structure that do not include a particular value of a selected parameter eliminated in the second graph data structure, wherein the parametric search mechanism contains nodes of the first graph data structure having particular parameters that are removed from the second graph data structure, wherein the child node ordering mechanism contains an order of child nodes in the first graph data structure that is modified in the second graph data structure according to ordering criteria.

* * * * *